(No Model.)
J. S. FIELD.
Sheet Metal Can.
No. 237,848. Patented Feb. 15, 1881.
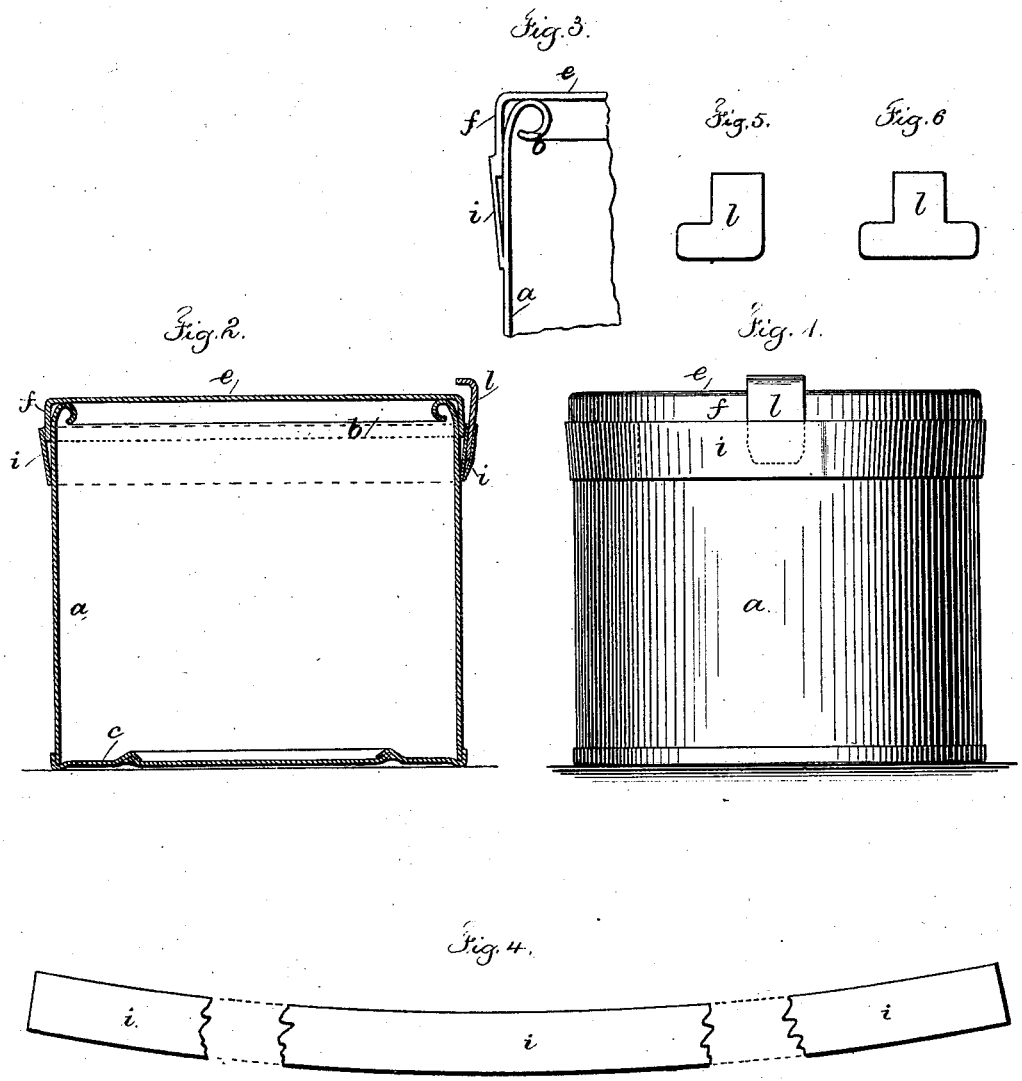

UNITED STATES PATENT OFFICE.

JOSEPH S. FIELD, OF BROOKLYN, NEW YORK.

SHEET-METAL CANS.

SPECIFICATION forming part of Letters Patent No. 237,848, dated February 15, 1881.

Application filed December 24, 1880. (No model.)

*To all whom it may concern:*

Be it known that I, JOSEPH S. FIELD, of Brooklyn, in the county of Kings and State of New York, have invented an Improvement in Sheet-Metal Cans, of which the following is a specification.

Sheet-metal cans have been made with a strip soldered at its edges to the flange of the cover and to the body of the can respectively; but the body of the can has been made with either grooves or ribs to prevent the solder running too far beneath the edge of the strip. In some instances the end of the strip has been left loose, or in the form of a bow, so that it might be grasped and pulled off in opening the can. Sometimes a pocket has been left at the end of the strip, where it laps upon the under part of the strip, into which pocket the end of a knife or other instrument is inserted for prying off the end of the band, so that it may be grasped by a suitable instrument and pulled off.

My present invention is for simplifying the construction of the can and at the same time allowing for the strip to be removed with facility in opening the can.

In the drawings, Figure 1 is an elevation of the can complete. Fig. 2 is a vertical section. Fig. 3 is a section, in an enlarged size, of the rim and sealing-strip, and Fig. 4 is a portion of the curved sealing-strip. Figs. 5 and 6 represent modifications in the shape of the separator.

I make use of a can-body of any desired size. I have shown the sides $a$ as contracted at the upper end, $b$, and rolled over to form a hollow edge for stiffening the metal, or any other form of upper edge may be used. The bottom $c$ may have the usual opening for filling, the same being closed by a disk that is soldered on.

The cover of the can is preferably made with the top $e$ and rim or flange $f$ in one piece; but it may be in two pieces soldered together.

The strip $i$ is not straight, but it is of a uniform width and cut upon an arc of a circle of a large radius, so that when bent up into the form of a hoop the sides incline or are slightly frusto-conical. The strip $i$ is, by preference, placed around the rim of the cover, and laps upon the same a short distance, and it is soldered. The cover and band are then placed upon the can and the edge of the band soldered to the body of the can. The object of making the band $i$ slightly conical is that it may fit tightly at one edge around the flange of the cover and at the other edge around the body of the can, which is of a smaller diameter than the exterior of the rim. Hence the edge only of the band will come into contact with the can-body, and the solder will run but little in between the band and the body of the can, but it will hermetically seal the parts, and when the can is to be opened there will be but little surface of solder from which the band has to be torn off. This manner of making and applying the band is available where the end of the band is left loose; but I prefer to solder the edges of the lapping end of the band to the under portion, and introduce a separator, $l$, between the underlap and the overlapping end of the band. This separator is preferably a piece of sheet-iron, with one end extending above the top of the can, so that it may be driven down or pried off to break the solder at the end of the band and loosen the end, so that it may be grasped and pulled upon to separate or strip off the band and leave the can in a condition for the cover to be lifted off. The separator may be soldered to the band, if desired, and it may be a straight piece, as shown in Fig. 1, or it may be L-shaped, as represented in Fig. 5, or T-shaped, as shown in Fig. 6, the cross portion being beneath the band, so as to act upon the lower line of solder when the separator is driven down. This allows the projecting portion of the separator to be narrow, and the wider part serves to break the solder close to the end of the strip.

I claim as my invention—

1. The combination, with a can-body having plain sides and the flanged cover, of a frusto-conical sealing-strip of uniform width and curved so as to set tightly upon the flange near its edge and upon the body of the can, and soldered, at the edges, to the cover and body of the can, substantially as set forth.

2. The combination, with the sheet-metal can and the sealing-strip, of a separator between the outer lapping end and the under portion of the strip, and held in place by the solder, which secures the outer lap, substantially as and for the purposes set forth.

3. In combination with cover and can-body, the removable sealing-strip and a separator having a lateral projection secured or held between the outer end of the sealing-strip and the underlap, substantially as specified.

4. The combination, in a sheet-metal can, of a body having a contracted and rolled upper end, a cover the rim of which fits upon the outside of the can-body, and a frusto-conical sealing-strip soldered to the rim and to the can-body, substantially as specified.

Signed by me this 20th day of December, A. D. 1880.

JOSEPH S. FIELD.

Witnesses:
GEO. T. PINCKNEY,
WILLIAM G. MOTT.